Jan. 4, 1944. M. GLOECKLER 2,338,426
EDUCATIONAL APPARATUS
Filed June 27, 1942
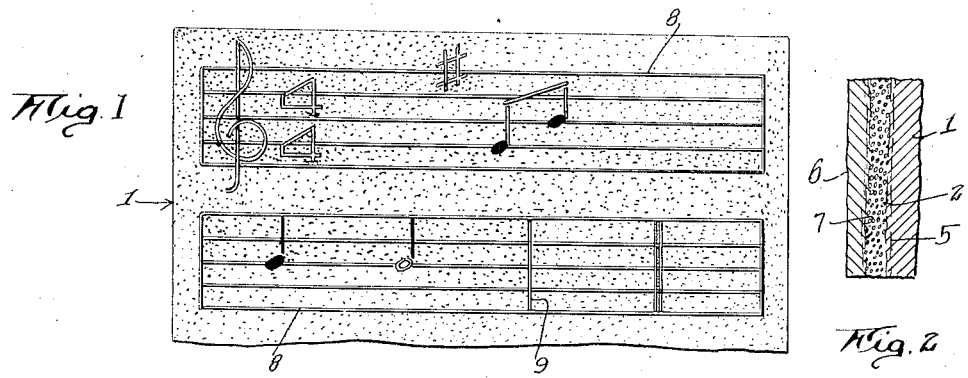
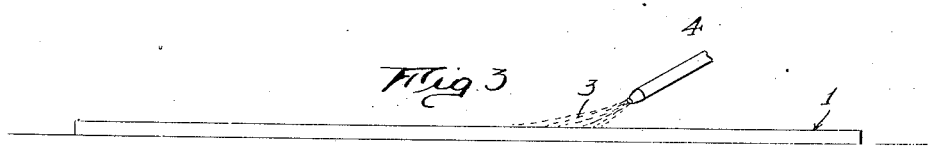
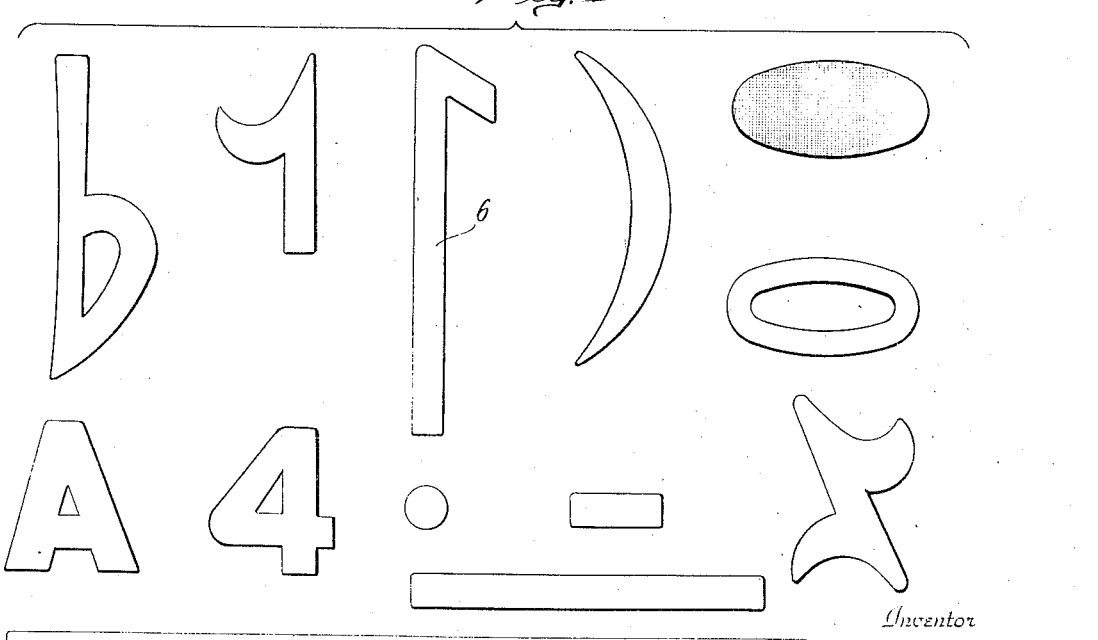
Inventor
Martha Gloeckler
By
Lyon & Lyon
Attorneys Patented Jan. 4, 1944

2,338,426

UNITED STATES PATENT OFFICE 2,338,426

EDUCATIONAL APPARATUS

Martha Gloeckler, Shafter, Calif.

Application June 27, 1942, Serial No. 448,716

2 Claims. (Cl. 35—27)

This invention relates to apparatus for presenting educational or informative matter to pupils, or to an audience.

The apparatus includes a "field" or board upon which small pieces or symbols may be applied, and which will adhere to the face of the board without necessitating the use of any fastenings such as pins. Such apparatus has many uses for educational purposes, for example, in teaching geography to children by requiring them to place boundary lines of States, rivers, mountains, and principal cities, on outline maps.

In teaching music, symbols representing notes can be applied by the children, to a staff line. The effect is superior to that attained where the child is required to use chalk on a blackboard, because the child is apt to be ashamed of the irregular appearance of the characters. When the invention is practiced the symbols are applied by the child, adhere "automatically" as it were, and the general effect of the child's work is pleasing. A better psychological effect is attained with the child.

The apparatus is intended to operate also as a substitute for a blackboard where figures are to be presented to an audience, for example, in a theatre or lecture hall, where a number written with chalk would be almost illegible to most of the audience.

In one aspect this invention may be regarded as an improvement of the apparatus disclosed in Patent No. 1,099,372, for an Educational apparatus, granted on June 9, 1914. In that patent was disclosed the use of an upright chart or surface having a face of frictional nature, upon which symbols could be held against the action of gravity, merely by pressing them against the face. The symbols had a facing or covering of felt which would adhere to the highly frictional face of the panel or board upon which the symbols were applied. The highly frictional face on the board or chart to which the symbols were applied, was also described as preferably being covered with felt, that is, felt cloth. In other words, the adhesion force that held up the symbols on the face, was that of felt against felt. Felt cloth is relatively expensive and, furthermore, the adhesion effect of felt on felt is not very marked.

The general object of the present invention is to provide a facing for the supporting face or board, the employment of which greatly simplifies the preparation of the board and the symbols for use in the manner described.

A further object of the invention is to provide apparatus of this kind, in which the facing material for the board and for the symbols, is applied directly to the face of the board, and the faces of the symbols without necessitating the use of felt cloth, and dispensing with the necessity for cutting the cloth and applying the same to the board and to the faces of the symbols.

Further objects of the invention will appear hereinafter.

The invention consists in the novel parts and combination of parts to be described hereinafter, all of which contribute to produce an efficient educational apparatus.

A preferred embodiment of the invention is described in the following specification, while the broad scope of the invention is pointed out in the appended claims.

In the drawing:

Fig. 1 is a front elevation of a supporting surface or "board" provided with lines indicated thereon as guides in having the symbols applied thereto.

Fig. 2 is a vertical section taken through the face of the board and the adjacent face of a symbol applied to the same and held in position through the adhesion of the coverings or facings applied to the board and to the symbol. This view is upon a greatly magnified scale.

Fig. 3 is a diagrammatic view illustrating the manner in which the material is applied to the face of the board.

Fig. 4 is a view indicating the number of symbols that may be employed where the lines on the board are to be composed of musical symbols.

Before proceeding to a more detailed description of the invention, it should be said that while it is described and illustrated in the following specification as applied to apparatus for teaching music to children, the invention is not necessarily limited to such use.

While apparatus embodying this invention can be used for presenting symbols of any kind upon a reading line, the apparatus is particularly useful for teaching music to children. The apparatus as applied to this purpose, includes a "board" or a relatively rigid backing member 1, the forward face of which is provided with a coating or covering 2 of flocked fibrous material. For this purpose I prefer to employ a flocking material consisting of a mixture of nylon and cotton fibers.

In applying the fibers to the face of the board, the board 1 is preferably held in a substantially horizontal position and the flocking material 3 is applied to it by means of a pneumatic nozzle or blower 4. It is the usual practice for the workman to hold this blower in his hand, and pass it across the upper face of the board to which a wet adhesive has been applied. The fibers issuing from the nozzle, come in contact with the adhesive and, of course, adhere to the board. The portions of the fibers unembedded in the adhesive constitute a "nap." The interlocking or meshing of these naps supports the symbols on the face of the "board."

In a similar manner I apply these flocked fibers to the face of any symbols such as illustrated in Fig. 4, that are to be used in composing the matter that is to be read on the lines of the board.

It is a common practice in flocking material on a surface, to pass the flocking nozzle across the surface in four different directions. This is done, I believe, to produce a more homogeneous and serviceable coating on the surface. However, this is not one of my objects. On the contrary it is one of my purposes to flock the fibrous material such as described, onto the board in a manner which will increase the adhesion effect between the symbols and the face of the board, and although I prefer to flock the material onto the face of the board from different directions, it is preferable to direct the last two passes of the nozzle across the board in two directions, each of which is directly opposite to the other direction. The purpose of this is to take advantage of the fact that the fibers tend to streamline themselves as they issue from the nozzle. In this way I induce the fibers composing the outer layers, to extend in more or less parallelism on the face of the board. These fibers should extend in a general horizontal direction when the board is set up for use. The last two passes of the nozzle across the symbols also are such that they will also extend in a general horizontal direction. While I believe that the holding effect of the engaging faces is most effective if the fibers extend in a general horizontal direction, if desired, the faces can be flocked so that the fibers extend in a general vertical direction. In any case, however, it is believed that the holding power is greatest if the fibers on the symbols extend in the same general direction as the fibers on the flocked face of the board.

In Fig. 4 I illustrate a number of different symbols that are employed in writing music. In preparing these symbols, they would be cut from flocked cardboard, flocked as described, by knives or dies, and the knives withdrawn so as to leave the symbols in place in the board, after which the symbols are punched out from the board and used as desired.

The action of the engaging faces of the symbols and the board is illustrated in Fig. 2, in which 5 designates the filaments that extend in a more or less vertical position on the faces of the board 1 and a typical symbol 6, the engaging "plane" of the coverings being indicated by the cross-sections of the filaments or fibers 7 that extend in a general horizontal direction.

The lines 8 on the face of the board, that are to be used for music lines, are preferably formed of a contrasting color. In other words, when the flocked material 2 is being flocked onto the face of the board, the position of the lines 8 would be indicated by the use of barred screens properly located on the face of the board. After the flocking of the area of the board is completed, then the screens are removed and oppositely formed screens are placed over the flocked face of the board. This second screen leaves the location of the lines unscreened, whereupon the contrasting colored material is flocked into the shallow grooves formed between the edges of the flocked areas.

However, if desired, the whole face of the board can be flocked as desired, and the lines printed thereon afterwards with a contrasting color. The symbols, of course, in the present instance, would include the different symbols used in music, including numbers which can be used to indicate the time. Of course, "sharp" symbols and "flat" symbols are also employed, which can be placed at any point desired along the lines. The flocked material on the board preferably does not include the vertical bars 9. These are made and used as long bar symbols flocked with the flocked material and set in place against the face of the board wherever desired. The music exemplified in Fig. 1, is a mess call involving the use of eighth notes on the top line, a quarter note and a half note on the lower line.

The teaching of music to children, with this apparatus, is most satisfactory and is far superior to any attempt to use an ordinary blackboard for this purpose. If a blackboard is employed, symbols drawn by the children are almost necessarily inaccurate and unsightly, and the child loses interest partly due to the unsightly appearance of his own work. But in teaching the children with this apparatus, they are greatly mystified by the fact that the symbols will adhere to the face of the board. The children are easily taught to apply the symbols in the proper manner, and the general effect is very pleasing to them, thereby intensifying their interest in their work.

What I claim is:

1. In apparatus for presenting lines of symbols to a reader thereof, the combination of a rigid member presenting a substantially upright plane face, said face having a covering of flocked fibrous material flocked directly onto the same; and one or more articles of shape constituting symbols adapted to be applied to the said lines, said articles having bodies of relatively stiff material with a covering of fibrous material, the flocked fibers of said coverings operating to become entangled to support the symbols at the first-named face against the action of gravity.

2. In apparatus for presenting lines of symbols to a reader thereof, the combination of a panel consisting of a relatively stiff backing material and presenting a substantially upright plane face, said face having a covering of flocked fibrous material flocked directly onto, and adhering to, the same in layers, the outer layer of said flocked material having its fibers extending in the same general direction; and one or more articles of shape constituting symbols adapted to be applied to the said covering, said articles each having a body of relatively stiff material with a covering of flocked fibrous material flocked directly onto the same including an outer layer in which the fibers of the flocked material extend in a definite direction with respect to the direction of the outer layers of the flocked material on the first named face, the said flocked fibers of said coverings operating to entangle and support the said articles at the said first named face against the action of gravity.

MARTHA GLOECKLER.